United States Patent [19]

Siegel

[11] Patent Number: 5,230,216
[45] Date of Patent: Jul. 27, 1993

[54] MAGNETIC SORPTION SELF COOLING AND SELF HEATING CONTAINERS

[76] Inventor: Israel Siegel, 2980 Point East Dr., Apt. D-612, N. Miami Beach, Fla. 33160

[21] Appl. No.: 918,605

[22] Filed: Jul. 27, 1992

[51] Int. Cl.[5] ............................................. F25D 5/00
[52] U.S. Cl. ........................................ 62/4; 126/263; 165/104.12
[58] Field of Search ................ 62/4; 126/263; 165/104.12

[56] References Cited

U.S. PATENT DOCUMENTS

| | | |
|---|---|---|
| 3,305,319 | 2/1967 | Kowalick et al. ............... 62/4 |
| 3,515,518 | 6/1970 | Halstead et al. ............... 62/4 |
| 4,528,218 | 7/1985 | Malone ............................. 62/4 |
| 4,752,310 | 6/1988 | Maier-Laxhuber et al. ..... 62/4 |
| 4,753,085 | 6/1988 | Labrousse ...................... 62/4 |
| 4,773,389 | 9/1988 | Hamasaki ....................... 62/4 |
| 4,850,424 | 7/1989 | Mitani et al. ................ 126/263 |
| 4,911,740 | 3/1990 | Schieder ........................ 62/4 |

Primary Examiner—Ronald C. Capossela

[57] ABSTRACT

The invention consists of sorption self cooling and self heating containers in which magnetic means are used to activate the containers. Water in an air evacuated chamber boils at low temperature and cools its surroundings. The vapor generated by the low boiling point liquid is removed by sorption by a desiccant placed in a separate chamber. The sorbed vapor heats the desiccant and it surroundings. The temperature changing potential of the device can be preserved indefinitely by a movable magnet-responsive iron barrier which prevents a communication between the liquid and desiccant chambers. The temperature changer is activated by an outside magnet which moves the magnet-responsive barrier.

9 Claims, 1 Drawing Sheet

MAGNETIC SORPTION SELF COOLING AND SELF HEATING CONTAINERS

BACKGROUND AND OBJECTIVES

The invention relates to self cooling and self heating containers, and in particular to reusable self-heating and self heating sorption containers which operate without valves which perforate the surfaces of the device. Previous inventions relating to sorption self cooling and self heating containers have been described by the present author in U.S. Pat. Nos. 4,250,720, 4,736,599, 4,928,495, 5,079,932, and 5,168,708. Essentially, the self cooling and self heating containers consists of a chamber containing water, the boiling point of which has been lowered by an air vacuum in the chamber. The chamber communicates through a pipe with another chamber containing a desiccant. As the water boils it cools itself and absorbs heat from a food or a beverage which is preferred to be consumed at low temperatures. The vapor generated by the low boiling point water is removed by the desiccant. The vapor sorbed by the desiccant heats the desiccant. The desiccant then delivers heat to a food or a beverage which is preferred to be consumed at high temperatures. By closing the communication between the water and desiccant chambers the self cooling and self heating device can be stored indefinitely without losing its temperature changing potential. The cooling or heating action is initiated by opening of the communication between the water and the desiccant chambers. Thus, a reversible closing of the communication between the water and the desiccant chamber is essential for the storage and operation of the device. This has been previously achieved by valve means which open and close the pipe between the chambers.

The air vacuum which is required to lower the boiling point of the water, must often be maintained through out months or even years of the shelf life of the food or beverage. To prevent an air leak into the system through the valve an air tight and leak proof valve is essential. Standard valves which are manipulated through means which have perforated the wall of the temperature changer present a continuous leak hazard and are not suited for such strict and long term vacuum requirements. Commercially available vacuum valves are too expensive for use in or commonly used beverage containers. In the recent U.S. Pat. No. 5,168,708 the present inventor described a pliable outside surface, such as a bellows, as means to open and close the communication between the water and desiccant chambers without perforating the surfaces of the chambers. The air vacuum in chamber 11 causes a pressure differential between the inside and the outside of bellows surface 52. The pressure differential tends to keep the bellows in its folded position during storage of the device and a manual effort is required to pull the bellows outward to an extended position. The main objective of the present invention is to provide effortless magnetic means to open and close the communication between the chambers while maintaining the integrity of the chambers surfaces.

SUMMARY

The self cooling and self heating device consists of a chamber containing water, the boiling point of which has been lowered by an air vacuum in the chamber. The chamber communicates through a pipe with another chamber containing a desiccant. As the water boils it cools itself and absorbs heat from its container. The container's walls then absorb heat from an immersing beverage. The vapor generated by the low boiling point water is removed by the desiccant. The vapor sorbed by the desiccant heats the desiccant. The desiccant then delivers heat to a food or a beverage which is preferred to be consumed at high temperatures. By closing and opening the pipe between the water and desiccant chambers the self cooling and self heating action can be stopped or started. This is accomplished by using a movable magnet-responsive barrier in the pipe, such as magnet-responsive stopper which opens and closes the communication between the chambers. The barrier is responsive to an outside magnet which moves the barrier in and out of the pipe. When the barrier is present in the pipe, the device can be stored indefinitely without losing it temperature changing potential. The device is activated by the removal of the barrier from the pipe by the outside magnet. In the reusable device electric coils associated with the desiccant chamber heat the desiccant to transfer the vapor sorbed the desiccant back into the liquid chamber.

DETAILED DESCRIPTION

Figure 1:
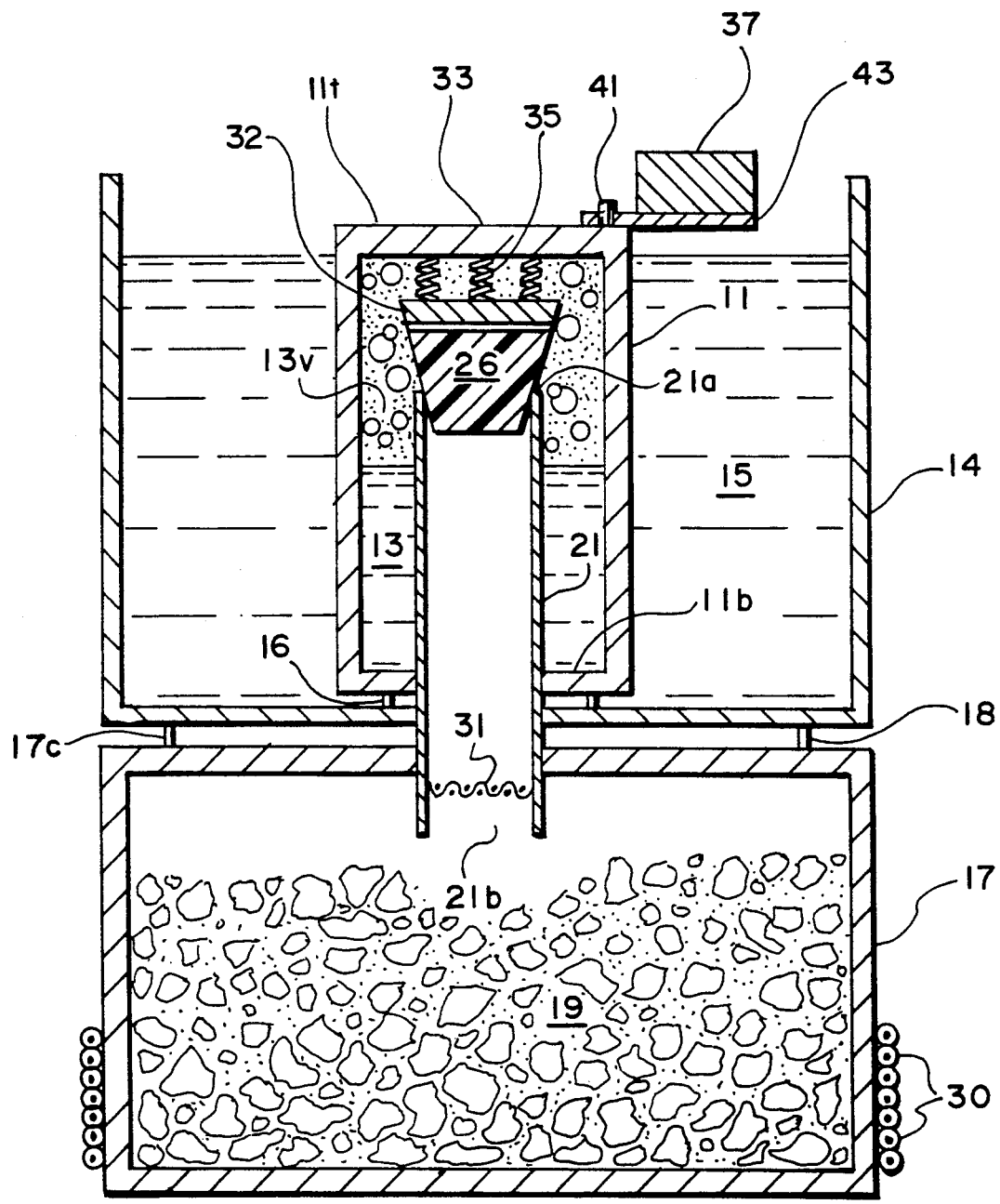
FIG. 1 is a cross-sectional view of a preferred embodiment of a reusable temperature changer in which the communication between the liquid and the desiccant chamber is opened and closed by an outside magnet.

Referring to FIG. 1, there is shown a chamber 11, with top wall 11-t and bottom wall 11-b. An air vacuum is present in the chamber. components which are exposed to atmospheric air are constructed of non-porous materials, such as tin, aluminum, or plastic. The material must be strong enough so that it does not deform during the presence of an air vacuum in the chamber. Water 13 is present in the chamber. The air vacuum required may be achieved through a temporary outlet (not shown) connected to an air pump (not shown). The same outlet may then be connected to a water source (while maintaining the air vacuum), to transfer water 13 into the liquid chamber 11. The outlet is sealed after the transfer of the water into the chamber. The water evaporates to form a vapor phase 13v above the liquid level of the water 13. Chamber 11 is placed in container 14. The container 14 may be open and may consist of any container which holds a food or a beverage such as such as a glass, a pitcher, a picnic cooler or a can. Wall extensions 16 from the bottom inside surface of container 14 are attached to the bottom outside surface of container 11 and serve to fix the position of chamber 11 in container 14. Present in container 14 is a beverage 15. The arrangement is that chamber 11 is immersed in beverage 15 to absorb heat from the beverage as will be described.

Present below chamber 14 is another chamber 17. A small air space 18 is present between the chambers. The air space serves as an insulating layer between the chambers. Wall extensions 17-e from the top outside surface of chamber 17 are attached to the bottom outside surface of chamber 11 and serve to fix the relative positions of chamber 11 and chamber 17. Inside the chamber 17 there is a desiccant 19, such as calcium sulfate, or a non-toxic molecular sieve like Silico Aluminate Zeolite. Present on the bottom outside surfaces of chamber 17 are electric heating coils 30. Associated with the coils is a thermostat (not shown) to keep the coils at a predetermined temperature. These function as the desiccant regenerating means, as will be described.

Present inside chamber 11 is a pipe 21. The arrangement is that pipe 21 is placed vertically in container 11. The pipe 21 contains a top open end 21-a and a bottom open end 21-b. Top end 21-a is placed at close distance to the top surface of container 11. The bottom portion of pipe 21 goes through the bottom walls of containers 11 and 14 and the top wall of container 17. The open end 21-a of pipe 21 thus communicates with the top inside space of container 11, while the open end 21-b of pipe 21 communicates with the top inside space of container 17. Solder is applied to the junctions of the pipe 21 and the container surfaces which have been penetrated by the pipe to fix the pipe in place, and to prevent any leakage from the junctions. Present on top of end 21-a is a stopper 26. The relative dimensions of stopper 26 and opening 21-a are such that the stopper can be placed in and out of opening 21-a. When the stopper is inserted into opening 21-a it blocks the opening and prevents a communication between chamber 11 and chamber 17. When the stopper is taken out of opening 21-a a communication is established between the chambers.

Present on top of stopper 26 is a magnet responsive layer material, such as an iron layer 32. Layer 32 is permanently attached to the top of the stopper and moves with the stopper. Present between layer 32 and top wall 11t of container 11 is a compression spring 35. The spring bias is such that it pushes layer 32 and stopper 26 downward to keep stopper 26 in opening 21-a. Attached to the outside surface of top wall 11t, in proximity to the side walls of container 11 wall 11t, is pivot 41. Attached to the pivot is arm 43. The arrangement is that the pivot penetrates arm 43 through a hole in one end of the arm. The fit allows the arm to turn around the pivot but does not allow the arm to be seperated from the pivot. Present on top of arm 43 is a magnet 37. The relative size of the arm and its position is such that as the arm turns around the pivot magnet 37 can be positioned in the center of surface 11t. Alternatively, as seen in FIG. 1, the magnet can be positioned in container 14 outside of surface 11t. Present on top of surface 11t is a painted spot 33. The position of the spot is such that it defines an area which is exactly opposite magnet-responsive iron layer 32. The relative strengths of magnet 37 and spring 35 are such that when the magnet is placed on spot 33 the attractive force of the magnet overcomes the bias of compression spring 35 and lifts stopper 26 out of the open end 21-a of pipe 21. When magnet 35 is removed from spot 33 the bias of spring 33 and natural gravity returns stopper 26 back into opening 21-a to close pipe 21.

Present inside pipe 21 is a filter 31. The filter is designed to block the transfer of desiccant 19 from desiccant chamber 17 to water chamber 11, but to allow a free movement of vapor between the chambers. The filter is glued to the inside walls of the pipe to prevent the filter from falling out of the pipe.

The operation of the device is as follows. When a cooling action is not desired magnet 37 is kept outside of spot 33. Stopper 26 is present inside opening 21-a and prevents a communication between chambers 11 and 17. The vacuum in chamber 11 causes the water mixture 13 to boil until the vapor pressure in chamber 11 becomes equal to the vapor pressure of the boiling water. This stops the additional boiling of the water, and the device can be stored indefinitely at ambient temperatures without losing its cooling and heating potentials.

When a temperature change is desired magnet 37 is pivoted to spot 33. The magnet then pulls iron layer 32, together with its attached stopper 26, upward. This removes the stopper from opening 21-a, and allows a communication between chamber 11 and chamber 17. This allows vapor 13-v to leave chamber 11 and enter chamber 17. The vapor which enters chamber 17 is absorbed or adsorbed by desiccant 19. This reduces the vapor pressure in the chamber 17 to below that of chamber 11. This causes an additional transfer of vapor from chamber 11 to chamber 17. The vapor in chamber 11 is then replaced by additional boiling of water 13 in chamber 11. The water boils continuously until desiccant 19 is saturated with water vapor, or until the temperature of water 13 drops to its low boiling point. When the temperature of water 13 drops it cools chamber 11. The relatively cold surfaces of container 11 then absorb heat from beverage 15. The vapor which is sorbed by desiccant 19 heats the desiccant. If desired, the hot desiccant can be used to heat a food or a beverage (not shown).

The temperature changing capabilities of the system can be renewed by a selective heating of the desiccant chamber through coils 30. This can be accomplished as follows. Magnet 37 is placed in spot 33 to remove stopper 26 from opening 21a and open the communication between chambers 11 and 17. Container 14 is filled with water to keep the water chamber 11 relatively cold. The desiccant chamber is then connected to household electric power for about 2 hours. During this period the coils 30 (controlled by a thermostat) heat desiccant 19 to about 250 degrees C. This expels the vapor sorbed by desiccant 19 back into water chamber 11. The vapor re-condenses into water in chamber 11, because of the relatively low temperature in chamber 11. After about 2 hours magnet 37 is removed from spot 33, while the desiccant is still hot. This causes stopper 26 to return to opening 21-a to close the communication between chamber 17 and 11. The desiccant chamber is then disconnected from the electric current. Water may be removed from container 14 and replaced by a new beverage either immediately or at later times. The device can then be stored indefinitely at ambient temperatures without losing its temperature changing potential. It can be reactivated by placing magnet 37 in spot 33 as described above.

It is understood that the embodiment illustrated in the detailed description has been given as a preferred example only, and that a variety of modification are possible without departing from the essence of the invention. This includes the use of refrigerants other than water, such as alcohol, or a freon.

While the invention described an outside magnet as means to manipulate a magnet-responsive stopper, solenoid valves may likewise be used without departing from the essence of the invention. Electric current to manipulate the solenoid valve may be provided by an associated battery, or by a temporary connection to a household current.

NUMERICAL EXAMPLE

The following is a numerical example, derived from working models of the device, illustrating the relative proportions of the active components required for the efficient operation of the device. The quantity of low boiling water 13, required to lower the temperature of beverage 15 by about 20 degrees C., should be about one tenth the quantity of the beverage which is to be cooled. The amount of a desiccant, such as calcium sulfate, (capable of sorbing 10% of its weight) should be approximately equal to the quantity of the beverage used. For example 50 ml of the low boiling point water, and 500 gram of the desiccant, would be required to lower the temperature of 500 ml of the beverage from 30 degrees to 10 degrees C.

What is claimed is:

1. A sorption temperature changer consisting of a heat exchange chamber,
   a liquid in said chamber,
   an air vacuum in said liquid chamber to lower the boiling point of said liquid,
   means to create said vacuum,
   a second chamber,
   a desiccant in said second chamber,
   a communication between said liquid and said desiccant chambers,
   and magnetic means to open and close said communication between the chambers, 2. The invention as described in claim 1 wherein said magnetic means include a magnet-responsive barrier and an outside magnet to manipulate said barrier.

3. The invention as described in claim 1 wherein said magnetic means consist of a solenoid valve.

4. The invention as described in claim 1 wherein said heat exchange chamber is immersed in a beverage to cool said beverage.

5. The invention as described in claim 1 wherein said liquid is water.

6. The invention as described in claim 1 and including means to regenerate said desiccant.

7. A reusable sorption temperature changer consisting of a chamber,
   a liquid in said chamber,
   a partial vacuum in said liquid chamber to lower the boiling point of said liquid,
   a means to create said vacuum,
   a second chamber,
   a conduit between said liquid and said desiccant chambers,
   a barrier associated with said conduit to open and close said conduit,
   a magnet-responsive material associated with said stopper to associate the movement of said magnet responsive material with said barrier,
   and an outside magnet to control the movement of said magnet-responsive material and said barrier.

8. The invention as described in claim 7 wherein said barrier consists of a stopper.

9. A valveless sorption temperature changer container consisting of a chamber,
   a liquid in said chamber,
   a partial vacuum in said liquid chamber to lower the boiling point of said liquid,
   means to create said vacuum,
   a second chamber,
   a desiccant in said second chamber,
   a conduit between said liquid and said desiccant chambers,
   a magnet-responsive barrier to prevent a communication between said liquid and said desiccant chambers during storage of the temperature changer,
   and an outside magnet to open and close said magnet responsive barrier.

* * * * *